United States Patent
Bieri

[15] 3,707,107
[45] Dec. 26, 1972

[54] SCREW CONNECTION FOR HIGH LOADING

[72] Inventor: Hans Bieri, Todistrasse 9, 8330 Pfaffikon, Switzerland

[22] Filed: Jan. 25, 1971

[21] Appl. No.: 109,417

[30] Foreign Application Priority Data

Jan. 26, 1970  Switzerland.............................1021

[52] U.S. Cl. .........................................85/1 T, 85/46
[51] Int. Cl. ........................F16b 33/04, F16b 35/00
[58] Field of Search.......85/1 T, 1, 46; 285/390, 334; 151/22; 287/189.36 F; 29/452, 446

[56] References Cited

UNITED STATES PATENTS

| | | | |
|---|---|---|---|
| 2,349,651 | 5/1944 | Davis | 85/1 T X |
| 3,205,756 | 9/1965 | Ollis et al. | 85/1 T |
| 3,323,402 | 6/1967 | Gowen et al. | 85/1 R |
| 3,394,626 | 7/1968 | Oliver | 85/1 R |

FOREIGN PATENTS OR APPLICATIONS

| | | | |
|---|---|---|---|
| 1,027,014 | 3/1958 | Germany | 85/46 |
| 1,078,809 | 9/1967 | Great Britain | 85/1 T |
| 340,099 | 9/1959 | Switzerland | 85/1 T |

*Primary Examiner*—Ramon S. Britts
*Attorney*—Flynn & Frishauf

[57] ABSTRACT

To interconnect structural units with a screw connection, for example with a bolt and nut, the threads of the bolt and nut are so selected that the pitch of the outer thread is smaller than the pitch of the inner thread and, additionally, the axial play (a) between the inner thread (1) and the outer thread (2) is greater than the difference in pitch arising within the length of the interengaging threads; to fasten the bolt and nut together, a pre-tensioning apparatus (8) is provided, which can be screwed on an extension of the bolt thread to axially pre-stress the bolt so that relative rotation of the holding nut and the bolt, under loading, can be avoided.

10 Claims, 3 Drawing Figures

3,707,107

SCREW CONNECTION FOR HIGH LOADING

The present invention relates to a screw thread interconnection of structural elements, in which a bolt, having a cylindrical outer thread, is to be connected to a cylindrical inner thread, either in a blind bore or in a nut, and more particularly in such a manner that the individual thread elements are essentially uniformly stressed.

Ordinary screw interconnections, when stressed in axial direction, provide uneven loading of the individual thread elements. Usually, the thread spirals adjacent the region where the loading force is applied are loaded more than the spirals remote from the application of force, or stress. Thus, the first spiral has to accept the greatest loading, the remaining spirals being less stressed. Various proposals have been made to improve the loading of the various threads in a threaded interconnection to avoid loading peaks at selected points. It has been proposed, for example, to provide bolt and nut (or blind bore) with threads of different pitch, in order to reduce the proportion of loading of the first thread spiral. The arrangement is such that first those threads which are remote from the application point of the loading force are stressed; after a certain elastic plastic deformation, the remaining thread spirals successively participate in force transfer. Such thread arrangements have one substantial disadvantage, namely that the cooperating thread portions, that is the inner and outer threads have to be relatively rotated upon mounting and removal under load in order to obtain the desired load distribution on the individual thread spirals. This relative rotation is difficult to carry out and the threads have a tendency to bind.

It has been proposed to stretch one of the two interengaging threaded parts during the manufacture of the thread in an axial direction so that, after the loading is terminated, the material will elastically assume its initial state, and so that the desired differences in the pitch between the bolt and the thread on the nut will be obtained. A similar effect can be achieved by compressing one of the thread parts in an axial direction, preferably while being heated. Manufacture of threads in accordance with these methods has the advantage that the threads can be made on ordinary thread cutting machines, not requiring any special set-ups, in other words, that no special threads must be made. Such manufacturing processes have not, however, found wide application in actual use since they are not sufficiently simple in ordinary manufacturing shops and, additionally, the required accuracy and reproducibility cannot be obtained, particularly under mass production conditions.

Male and female threads can be engaged within the threaded region and without essential axial play by forming the male and female threads with different pitch, and then prestressing the threaded connection upon screwing together nut and bolt. With increasing operating loading, the usually most stressed initial spirals of the threads are first unstressed. Thus, an unloading of the previously negatively pre-stressed threads is obtained. It is difficult to engage such threads and it is a disadvantage that, upon interconnecting such threaded arrangement, the difference in pitch must be overcome by elastic torsion of the material. Very high friction arises, and the portions of the thread, to be relatively rotated with respect to each other, tend to bind strongly and to freeze together.

It is an object of the present invention to provide a screw connection capable of high loading in order to interconnect structural elements, in which high stresses can be transferred to the thread, with minimum space requirements.

Subject Matter of the Present Invention

Briefly, the thread arrangement provides an inner and outer thread of different pitch, which is additionally so arranged that the axial play between inner and outer thread is equal to or greater than the overall pitch difference over the length of interengagement of the thread elements. In accordance with a feature of the invention, and to provide for application of this thread arrangement under load, a pre-stressing device can be secured to the bolt in order to obtain an axial pre-stressing or bias thereon, so that relative rotation of the thread elements, under load, can be avoided.

The screw connection in accordance with the present invention is capable of transmitting high connecting forces, and requires only a small space. The load distribution of the various single thread spirals is essentially uniform, and thus high forces can be transmitted. The screw connection is suitable for brittle as well as soft materials, such as cast iron, aluminum, or copper, without causing damage to the threads, or being subject to difficulty of binding or freezing together of the relatively rotatable thread elements. When pre-stressing the bolt, relative rotation under load is not necessary. A high accuracy of the desired pre-stressing, or biassing force can be obtained by hydraulically pre-stressing the bolt, which enables optimum utilization of the characteristics of the materials being used and, further, maintenance of design safety factors.

The invention will be described by way of example with reference to the accompanying drawings, wherein.

Figure 3:
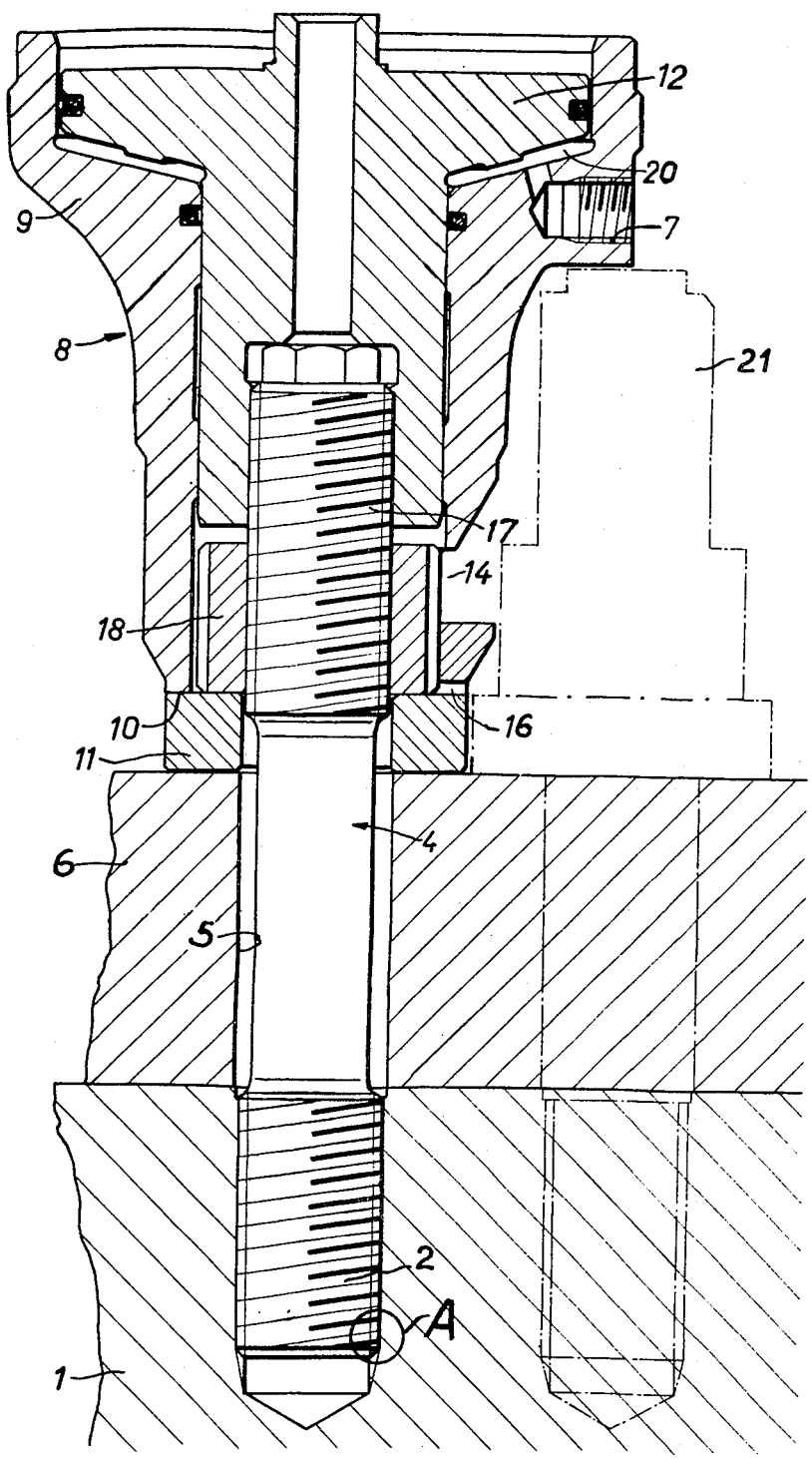
FIG. 3 is a longitudinal vertical cross-section through a screw connection of structural elements utilizing a hydraulic pre-stressing unit connected to the bolt.

The screw connection is made between a cylindrical, female inner thread 1 and a cylindrical male outer thread 2 and is utilized for fixedly interconnecting structural elements; it is not designed to be a movable thread, in the nature of a worm. The inner thread 1 is located either in a nut, or in a blind bore in one of the parts to be interconnected. The male outer thread 2 is applied to a bolt. Let it be assumed that the part carrying the inner thread 1 is stationary and that the outer thread 2 has a force applied thereto in the direction of the arrow P (FIGS. 1, 2), that is, is being pulled upwardly. These force relationships may occur for example in the interconnection of FIG. 3 in the portion outlined by the circle A when the bolt is pre-stressed, that is, is being drawn upwardly. The same situation will obtain when the pre-stressing apparatus, to be explained in more detail in connection with FIG. 3, is removed after nut 18 is placed on bolt 4.

Both the inner threads as well as the outer threads have generally trapezoidal cross-sectional form, with the roots of the threads being rounded. The thread angle α of the outer thread 2 is less than 45° and suitably may be between 20° and 30°, preferably about 24° to 27°. The axial clearance a between the inner and outer threads is selected to be large with respect to the standard thread play as determined by the thread standards, for example as set by the SAE, National Coarse or Metric Norms. The axial clearance, or play a results in substantially improved stress and force distribution on the various thread spirals, upon correction for pitch, to be described. The axial clearance a is substantially greater than the radial clearance b, so that the bolt is well centered with respect to the nut at the base of the inner thread 1 and the outer diameter of the outer thread 2. The pitch h of the inner thread 1 is high with respect to the engaging depth of the threads and is at least 1.5 times the depth of the thread projection d; preferably, it is about 2.2–2.7 times this depth. The radial play c between the root of the outer thread 2 and the inner diameter of the inner thread 1 is substantially greater than the radial play b so that the parts are centered by engagement of the outer diameter of the outer, male thread 2.

Figures 1, 2:
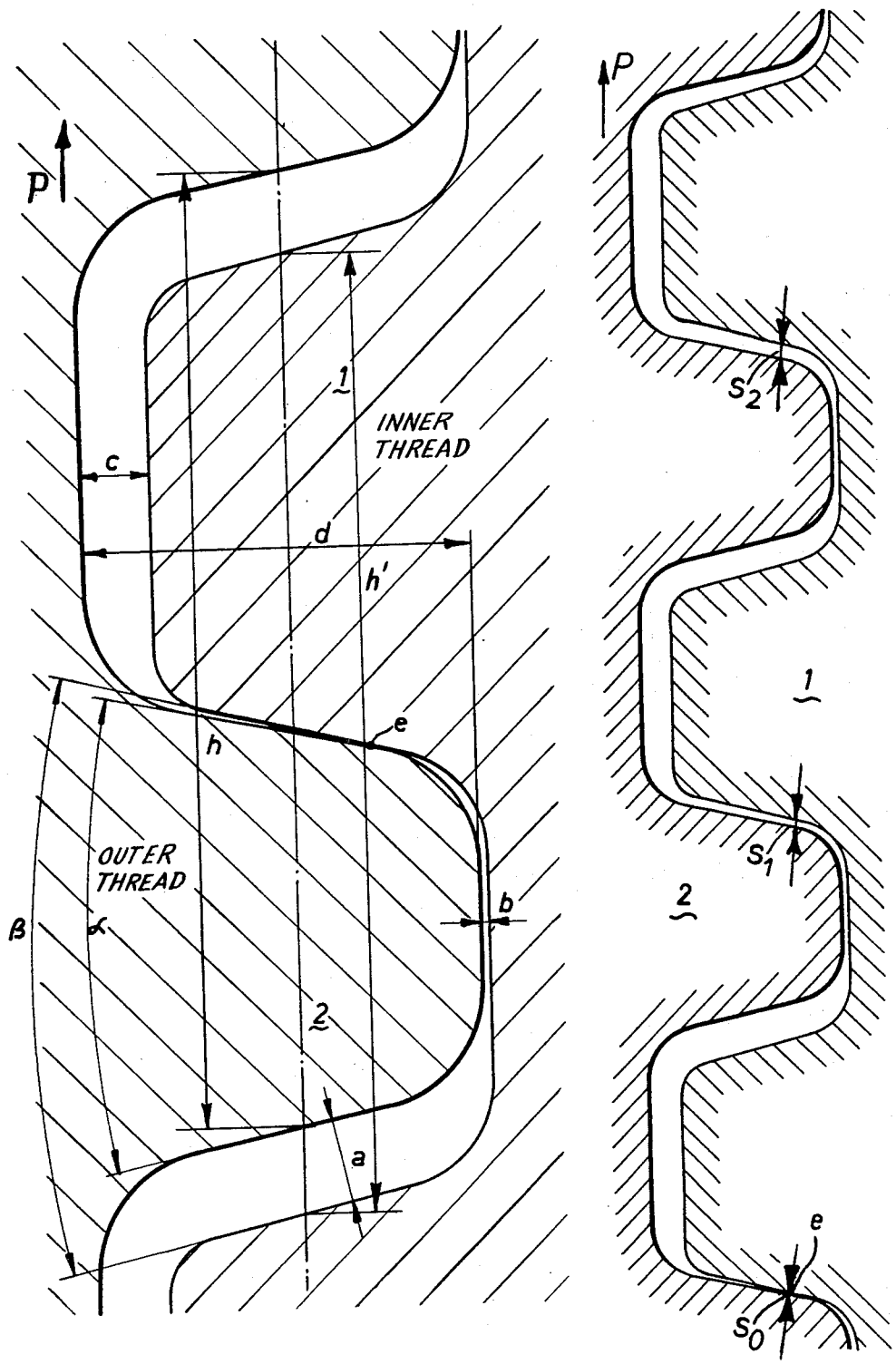
FIG. 1 is a longitudinal profile section, to a greatly enlarged scale, of the screw connection illustrating interengagement of spiral threads of an outer (female) and an inner (male) thread.
FIG. 2 is a cross-sectional view, to a smaller scale than FIG. 1, of a thread connection.

The pitch of the female thread 1 is selected to be somewhat greater than the pitch of the male thread 2, as seen in FIG. 2. The difference in pitch results, within the axial length of the interengaging thread portions, in linearly increasing distances $s_0$, $s_1$, $s_2$ between adjacent flanks of the thread, as seen in FIG. 2. The axial play a between the male and female threads is so selected that the interengaging thread spirals do not bind, in spite of the pitch difference, but can be rotated relatively to each other with ease. As the length of interengaging portions of thread increases, the axial play must likewise be increased.

The outer, male thread has a smaller pitch than the inner, female thread; this results in a substantially even distribution of loading force on the force-transferring parts of the thread, which is much greater than in threads in which the pitch of the inner and outer threads is the same. As a result of the pitch difference between inner and outer threads, those thread spirals of outer thread 2, which are farthest removed from the point of force application, engage the inner thread 1. With increasing axial force, the material will strain and, eventually, successive ones of the remaining thread spirals will engage due to elastic and plastic deformation, and thus transmit force. The pitch difference between the inner and the outer thread is selected, in dependence on design loading of the material of the bolt, and the modulus of elasticity of the materials of the pairs of thread elements in such a manner that high strength interconnections of structural elements, and machinery parts can be made, which, for example, are formed of nodular or ductile cast iron, light metal castings, grey castings or copper.

The relatively flat flank angle of the trapezoidal thread, that is, the angle preferably between 20° and 30° and less than 45° results in substantially smaller radial force components tending to spread the nut, or the blind bore upon application of force, in contrast to the usual pointed threads which have a flank angle of 55°–60, in accordance with usual standards. Additionally, the notch effect which results upon loading of pointed threads, triangular in cross-section, is essentially avoided by selecting a trapezoidal shape. Due to the smaller radial loading on the nut, or the zone surrounding a blind bore, it has become possible to hold the overall diameter of the nut, or the holding zone of the blind bore fairly small. Thus, if a plurality of bolts are to be placed in a structural element, the minimum distance between adjacent bores can be decreased, improving the space factor and enabling a more compact construction of machinery or structural elements.

The bearing flanks of the inner and outer threads are slightly different before being first loaded. For example, one of the flanks may be — in cross-section — straight and the other slightly bent or bowed. Alternatively, both flanks may be slightly bowed, or curved (in cross-section) similar to inter-engaging teeth of gears. Also, the flank angle α of the outer thread can be selected to be slightly smaller than the flank angle β of the inner thread.

The differences in flank form, upon start of biassing, or pre-loading, provide for a high specific surface loading. As a result, plastic deformation of the portions of the flanks touching each other will occur. This deformation, together with the difference in pitch, provides for even load distribution when the screw connection is fully pre-stressed. The even load connection will distribute itself on the respective thread parts. The difference between the thread angles α and β should be less than 5 percent, preferably in the order of about 3 percent. It is desirable that the angle β of the inner thread 1 is about 27 percent, and the angle α of the outer thread about 24 percent. Since the point e at which the force is applied is closer to the outer diameter of the outer thread than to the root of the thread, a relatively small bending load of the various inner thread spirals is applied upon application of force. Due to the small surface at which load is actually applied, upon first loading of the thread, the flanks of the threads are compressed and formed upon pre-stressing; upon increasing loading, an increasing zone of the thread flanks comes in contact and begins to transfer force. Upon increasing axial loading of the bolt, the various thread flanks will compress and the bolt will elastically increase its length. The material of the threads, in the zones of force transfer may also become somewhat more dense.

Good load distribution can be obtained with deep, or elongated nuts, as well as with relatively deep blind bores. Thus, thread interconnections with material are possible in which conventional threads cannot be used. Relatively soft materials are, for example, preferably so made that the inner thread is longer than twice of the thread diameter.

High flank loading does not permit relative rotation between the male and female threads under load. To obtain uniform load distribution on all the elements and portions which transfer force, a pure axial pre-loading of the thread is desirable. Pure pre-loading excludes torsion, or relative rotation of the thread parts with respect to each other. This pure axial pre-loading can be obtained by means of the pre-loading or biassing apparatus illustrated in FIG. 3.

A bolt 4 has axial tension applied thereto by pre-loading unit 8. The bolt 4 has an extension, which is likewise threaded, and which extends beyond the nut 18, so that the biassing element can be screwed on the bolt, for application thereto and removal therefrom, after the thread connection has been made.

Bolt 4 engages with its lower threaded portion 2 in an inner thread formed in a blind bore of a structural member or body 1. The cylindrical, unthreaded portion of bolt 4 passes through a clearance hole 5 of an intermediate structural element 6. The upper threaded portion of the bolt 4 has a nut 18 screwed thereon, bearing against element 6 by means of an intermediate washer 11. When nut 18 bears against washer 11, the portion 17 of the bolt extends upwardly over and beyond the nut 18. To pre-stress the screw connection, the pre-stressing unit 8 is screwed on thread portion 17. After pre-stressing and application of nut 18, the pre-stressing unit can be removed. The pre-stressing unit 18 strains the bolt 4 within the elastic zone of the material of the bolt by a desired amount. The pre-stressing unit 8 bears with a lower bearing surface 10 on washer 11, or can be applied directly to bear against body 6. A piston 12 is located within the interior of housing 9. Pressure fluid is applied over a line 7, by means well known and not shown in the drawings, to move the piston 17 upwardly. To permit use of the pre-stressing element 8 also on places which are difficult to reach, or in connection with bolts 4 which are placed close to each other, it is preferred that the lower housing part is of reduced diameter with respect to the upper portion of the housing of unit 8. Piston 12 is shaped to conform, as seen in FIG. 3.

When the pre-stressing element 8 is screwed on bolt 4 and piston 12 is subjected to pressure fluid, piston 12 will draw the bolt upwardly. Unit 8 is secured to the bolt by screwing the piston 12 over the thread portion 17 extending beyond nut 18. Pressure fluid such as oil is applied, for example by means of a hand or foot operated pump, or from a reservoir, to chamber 20 through inlet duct 7. The pressure fluid in chamber 20 forces piston 12 upwardly. The tension applied by the upward pressure of piston 12 is transferred to bolt 4 which will stretch. Nut 18 can be turned by means of a suitable tool extending through a slit 14 formed in housing 9 of unit 8. The nut 18 should fit snugly against washer 11. Nut 18 is thus not turned under load and is not used to cause a pre-tension in the bolt, but only in order to maintain the tension in the bolt when the nut has been positioned. After the nut is snug against washer 11, pressure is released and piston 12 can easily be removed from the threaded portion 17 of the bolt, so that the pre-stressing unit 8 can be removed. The tension applied by the pre-stressing unit 8 can be checked, for example by means of a thickness gauge inserted through an opening 16 in the lower face 10 of the housing. A pressure indicator can be connected to the pressure line 7 in order to determine the pre-stressing force being applied. Reading the pre-stressing force, and setting it for a predetermined design value ensures that safety factors with respect to the elastic limits, and strength of the materials used for the bolt are not exceeded. In conventional screw connections, even torque wrenches cannot provide accurately stressed interconnections, since the coefficients of friction between threaded elements, relatively rotated under load, frequently deviate substantially from previously calculated values.

The pre-tensioning element, as described, can be applied at any time, and even after the connection has been made, for example to check the proper tension on the bolt and, if necessary, effect its correction by rotation of nut 18.

To protect the extending thread portion 17 of bolt 4, a protective cap 21 is preferably applied over the bolt after removal of the pre-stressing unit 8.

The arrangement in accordance with FIG. 3 has been shown in connection with a body 1 in which a blind bore has been formed, threaded as previously disclosed; to interconnect structural elements or other bodies it is, of course, possible to utilize a bolt 4 which is threaded at both ends, and has nuts secured to both ends, to use headed bolts, or bolts having other holding elements, such as cross pins or the like.

The pitch difference between the inner thread and the outer thread preferably changes linearly from thread to thread. It is also possible to provide for non-linear variations in the pitch difference between inner thread and outer thread to obtain a theoretically uniform force distribution on all the thread spirals participating in force transfer. It is difficult, however, to manufacture threads in which the pitch is varying non-linearly with thread length; such progressive change in pitch difference therefore is desirably used only in restricted and selected situations, where absolutely uniform force distribution is essential.

Various changes and modifications of the threaded interconnections can be made as required by specific designs, within the scope of the inventive concept.

I claim:

1. Highly loadable threaded connection for a pair of bodies (1, 6) in which the threaded connection after engagement is not adapted to be unscrewed under load utilizing a bolt (4) and an internally threaded body (18) having an outer thread (2) formed on the bolt;

an inner thread formed in one of the bodies (1), the threads on the bolt and at least one of said bodies being characterized by the pitch ($h$) of the outer thread (2) is smaller than the pitch ($h'$) of the inner thread (1);

the axial clearance ($a$) between the outer thread (2) and the inner thread (1) is greater than the distance defined by the difference in pitch over the axial length of the inter-engaging thread portions, the number of convolutions of the inter-engaged threads is more than three;

the pitch ($h'$) of the inner thread (1) is at least 1.5 times the thread depth ($d$) of the outer thread (2);

the cross-sectional outline of the threads is of approximately trapezoidal shape and of a flank angle of less than 45°, the inner and outer threads having different flank angles and the end of the bolt not inserted into the threaded body is formed with attachment means (17) to enable pre-stressing of the bolt to place the bolt under axial tension and permit unstressed relative rotation of the bolt and the bodies, respectively, and loosening of the connection upon again stressing of the bolt.

2. Thread connection according to claim 1, wherein the flank angle is of about 15°–30°.

3. Thread connection according to claim 1, wherein the pitch ($h'$) of the inner thread (1) is about 2.2–2.7 times the thread depth ($d$).

4. Thread connection according to claim 1, wherein the difference between said flank angles of the inner and outer threads (1, 2) is less than 5°.

5. Thread connection according to claim 1, wherein the inner thread (1) has a flank angle of about 27° and the outer thread has a flank angle of about 24 degrees.

6. Thread connection according to claim 1, wherein the pitch ($h$) of the thread on the bolt (4) starting from the free end thereof is progressively decreasing.

7. Thread connection according to claim 1, wherein the flanks of the thread of one of the bodies, before being first stressed, are shaped to effect straining of the material of the body carrying the inner thread above the yield point.

8. Thread connection according to claim 1, wherein the attachment means formed on the bolt (4) comprises an extending thread portion (17) formed on the bolt (4) to provide a removable attachment region to pre-stress the bolt in axial tension.

9. Thread connection according to claim 1, further comprising a pre-stressing device (8) secured to said attachment means and bearing against one of the bodies.

10. Thread connection according to claim 9, wherein the attachment means formed on the bolt (4) comprises an extension formed on the bolt projecting beyond the bodies secured thereto, said extending projection being formed with a recessed portion providing for attachment of the pre-stressing device.

* * * * *